United States Patent
Kjaer

(10) Patent No.: US 7,942,535 B2
(45) Date of Patent: May 17, 2011

(54) COLOR WHEEL

(75) Inventor: Lars Barslund Kjaer, Hovedgaard (DK)

(73) Assignee: Martin Professional A/S, Aarhus N (DK)

( * ) Notice: Subject to any disclaimer, the term of this patent is extended or adjusted under 35 U.S.C. 154(b) by 436 days.

(21) Appl. No.: 12/112,078

(22) Filed: Apr. 30, 2008

(65) Prior Publication Data
US 2009/0273763 A1 Nov. 5, 2009

(51) Int. Cl.
*G03B 21/14* (2006.01)
(52) U.S. Cl. ............ 353/84; 353/31; 348/743; 359/889; 359/891; 359/892
(58) Field of Classification Search ............... 353/30, 353/31, 84; 348/739, 742, 743, 771; 359/885–892; 356/418
See application file for complete search history.

(56) References Cited

U.S. PATENT DOCUMENTS

| | | | | |
|---|---|---|---|---|
| 2,231,719 A * | 2/1941 | Hughey | ......................... | 362/319 |
| 3,491,886 A * | 1/1970 | Glos et al. | ..................... | 210/232 |
| 4,800,474 A * | 1/1989 | Bornhorst | ..................... | 362/293 |
| 5,838,860 A * | 11/1998 | Kingstone et al. | ........... | 385/100 |
| 5,967,636 A * | 10/1999 | Stark et al. | ...................... | 353/84 |
| 6,011,662 A * | 1/2000 | Evans | ............................ | 359/891 |
| 6,142,652 A * | 11/2000 | Richardson | ................... | 362/280 |
| 6,879,451 B1 * | 4/2005 | Hewlett et al. | ................ | 359/891 |
| 6,971,770 B2 | 12/2005 | Rasmussen et al. | | |
| 6,994,439 B2 * | 2/2006 | Basey | ............................ | 353/119 |
| 2002/0075685 A1 * | 6/2002 | Rasmussen et al. | ........... | 362/282 |
| 2008/0099383 A1 * | 5/2008 | Gardenier et al. | .............. | 210/86 |
| 2009/0273763 A1 * | 11/2009 | Kjaer | ............................ | 353/84 |

FOREIGN PATENT DOCUMENTS

| | | |
|---|---|---|
| EP | 1 293 722 A1 | 3/2003 |
| WO | 2004/031825 A1 | 4/2004 |
| WO | 2004/046607 A1 | 6/2004 |

* cited by examiner

*Primary Examiner* — John R Lee
(74) *Attorney, Agent, or Firm* — Roberts Mlotkowski Safran & Cole, P.C.; David S. Safran

(57) ABSTRACT

A light fixture having at least one light source for generating a beam of light, a plurality of color filters are rotatable into position to intercept the light beam. The color filters are fixed to the color wheel by a central spring which has a number of radial protruding tongues for fixation of the color filters. The color filters are removable yet are secured in a correct position by radial protrusions formed between the color filters an circular outer protrusion located outward of the color filters so as to form a cavity that surrounds the color filter at both sides as well as at outward. Inward of the color filters, they are fixed by the protruding tongue that presses them down and keeps them in place. This leads to a nearly perfect fixation of each color filter, which can be exchanged if necessary.

5 Claims, 3 Drawing Sheets

COLOR WHEEL

BACKGROUND OF THE INVENTION

1. Field of the Invention

The present invention relates to a light fixture comprising at least one light source for generating a beam of light, which light fixture comprises at least one color wheel, which color wheel comprises a plurality of color filters mounted on the periphery of the wheel, which filters are positioned mostly contiguous to each other, which color wheels is rotated to place the peripheral color filters in position to intercept the light beam, which color filters are replaceable, which color filters are fixed to the color wheel by a central spring, which central spring comprises a number of radial protruding tongues for fixation of the color filters.

2. Description of Related Art

U.S. Pat. No. 4,800,474 concerns a lighting fixture, which light fixture includes a source for producing a beam of light and pair of color wheels. Each of the color wheels has a plurality of dichroic filters mounted on the periphery of the wheel with the filters positioned contiguous to each other. The light beam is directed to a focal point. Each of the color wheels can be rotated to place the peripheral dichroic filters in position to intercept the beam. One of the color wheels is equipped with long wave pass dichroic filters while the other color wheel is equipped with short wave pass dichroic filters. By aligning various combinations of these filters, a large number of different colors with different saturations can be produced. The cut-off wavelengths for the dichroic filters are selected to be different at the long and short wavelengths of the filter set, such that there is produced a perceived uniform graduation of colors across the spectrum. Each of the dichroic filters mounted on the color wheels is in a shape of a trapezoid and is mounted adjacent other filters, such that there is no blanking of light or leakage of light in the process of changing from one filter to the next.

U.S. Pat. No. 5,060,126 concerns color wheel for lighting fixture, which color wheel includes a polygonal metal plate, which has slotted metal bars seated on the side edge of the polygonal plate with rectangular glass plates, e.g., dichroic filters adhesively held in the slots of the metal bars spaced. The glass plates are not in direct contact with the metal bars and are spaced close to each other, but not in contact, in a peripheral array.

U.S. Pat. No. 6,011,662 describes a color wheel for lighting fixtures comprising a hub wherein removable, user-selected dichroic filters are engaged by a spring element. The filters are removable held by two pegs extending upward and one nub extending downward. The filters can be lifted for removal.

SUMMARY OF THE INVENTION

It is an object of the pending patent application to describe a color wheel where the color filters are removable and where the color filters placed at the color wheel are secured in a correct position. A further object of the invention is to avoid use of glue for fastening the color filters.

This can be achieved by a color wheel of the initially mentioned type if the color wheel further comprises a number of radial protrusions formed between the color filters, which color wheel also comprises an outer circular protrusion at the outside the color filters.

It can hereby be achieved that color filters are fixed in their position because these are placed in a cavity that surrounds the color filter at both sides as well as at the outside. Inwards the color filter is fixed by the protruding tongue that is pressing down the color filter and keeping it in place. This will lead to a nearly perfect fixation of a color filter, which can be exchanged if necessary. The correct placement of a color filter achieves the total performance quality of a light show, as these color filters will be kept in the correct position, independent on movements of for example a moving head or the rotation of the color wheel. If the color has to be changed, it is very easy to exchange one or more of the color filters and then achieve other colors if this is preferred in the next performance of a light show. Placing the color filters in the cavity also leads to a protection of the color filters during service of a light fixture. During service, it is possible to exchange the color wheel with another color wheel comprising another combination of color filters. During that handling, it is very important that the color filters are protected against dirty fingers and/or mechanical impact from tools.

In a preferred embodiment for the invention, the color wheel comprises a protection material placed below the color filters and below the radial protruding tongues. Hereby it is achieved that the material below the protruding tongue is protected against the edge of the color filter. A color filter is probably formed of a quartz glass, which is extremely hard in relation to the metal surface of the color wheel. In order not to damage the color wheel with scratches or damage the color filter, it is very important that some kind of protective material is placed under the color filter, as during placement of the color filter, the edge of the color filter will be in touch with that surface.

The color wheel can be formed of a molded component to which molded component the radial protruding tongues and the protection material are fixed. One possible way of forming a color wheel is by molding. In this way, a high number of color wheels could be produced relatively cheaply when the tooling is fabricated.

The color wheel can mostly be formed of a material comprising magnesium. One possible way is to produce the color wheel in magnesium or a magnesium alloy. Other material would also be possible; however, one of the benefits with using magnesium is a very low weight.

The color wheel can be held in place on an axle by magnetic attraction. The color wheel can be attract to an axle in different ways; one way of keeping the color wheel in a correct position, is by placing a magnet maybe in the center around the axle at the color wheel or placing the magnet at the fixture and letting the magnet attract a central ring placed around the axle. In this way, it will be very easy to replace a color wheel.

Around a central opening in the color wheel, a tooth wheel is formed so that an external tooth wheel can interact with the tooth wheel at the color wheel and in this way rotate the color wheel.

At the outside of the color wheel, a small opening can be formed, which can be detected by an optical or mechanical detector in order to tell a computer system where the correct position is for the color wheel. This is important if a color wheel has been exchanged. During operation, by computer means a light fixture will probably be able to calculate the actual position of the color wheel in different situations as long as there is no power down.

DETAILED DESCRIPTION OF THE INVENTION

Figure 1:
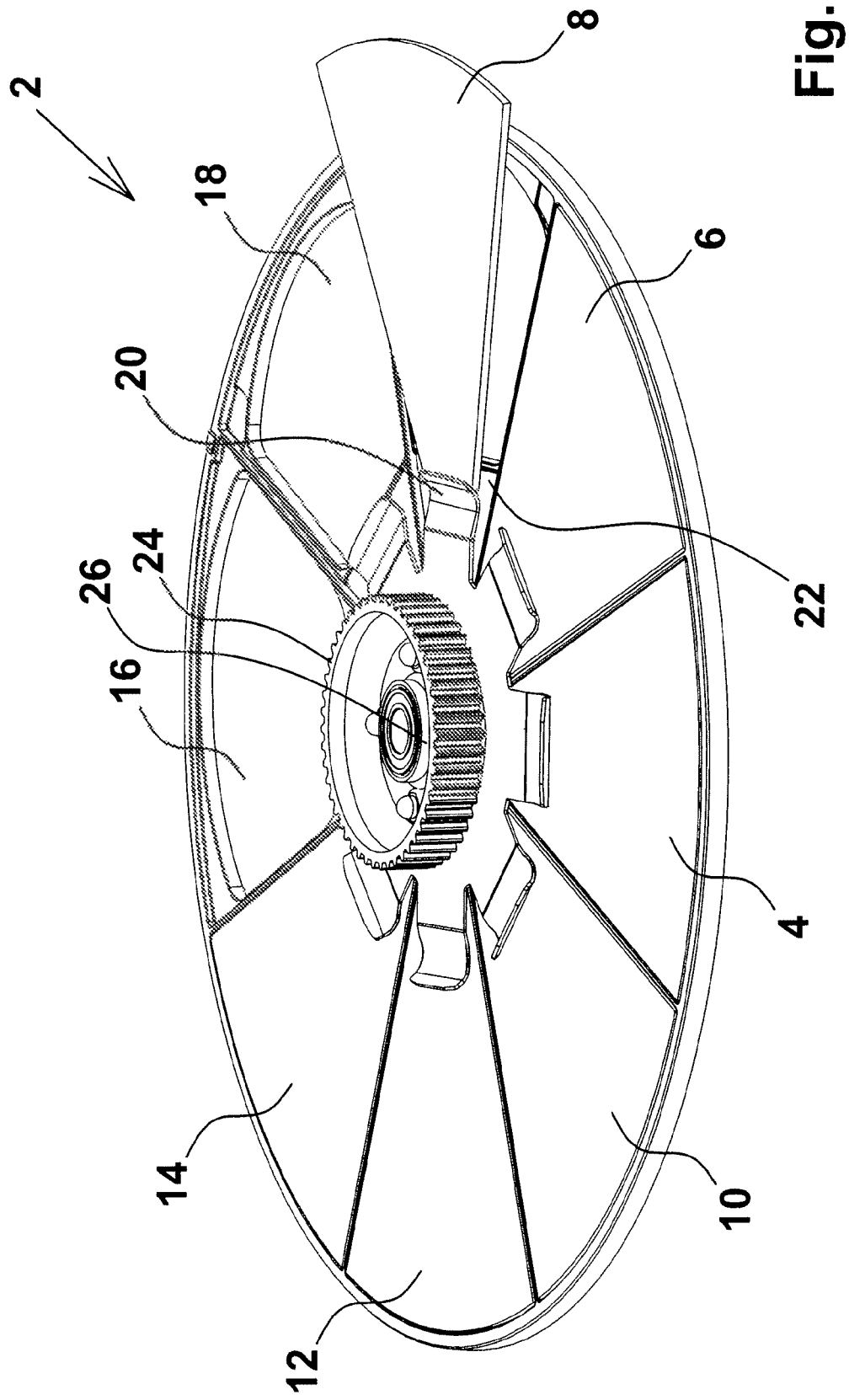
FIG. 1 shows a color wheel.

FIG. 1 shows a color wheel 2 for use in a light fixture. The color wheel 2 comprises a number of color filters 4, 6, 8, 10, 12, 14 and 18. Between the color filters 14, 18, an empty space 16 with an opening is shown. The color wheel 2 comprises radial protruding springs 20 for fastening the color filters. Below the radial protruding springs, a protecting plate 22 is shown. Around the center of the color wheel, a tooth ring 24 for rotating the color wheel is placed. Inside the tooth ring 24, a bearing 26 is shown.

As shown in FIG. 1, the color filter 8 is not in place; however, it is in position to be placed correctly below the radial protruding spring 20. It can be seen in FIG. 1 that the front edge of the color filter 8 is touching the protecting plate 22 where the protecting plate 22, during placement or removal of the color filter 8, will protect the color wheel, as such, against scratches.

Figure 2:
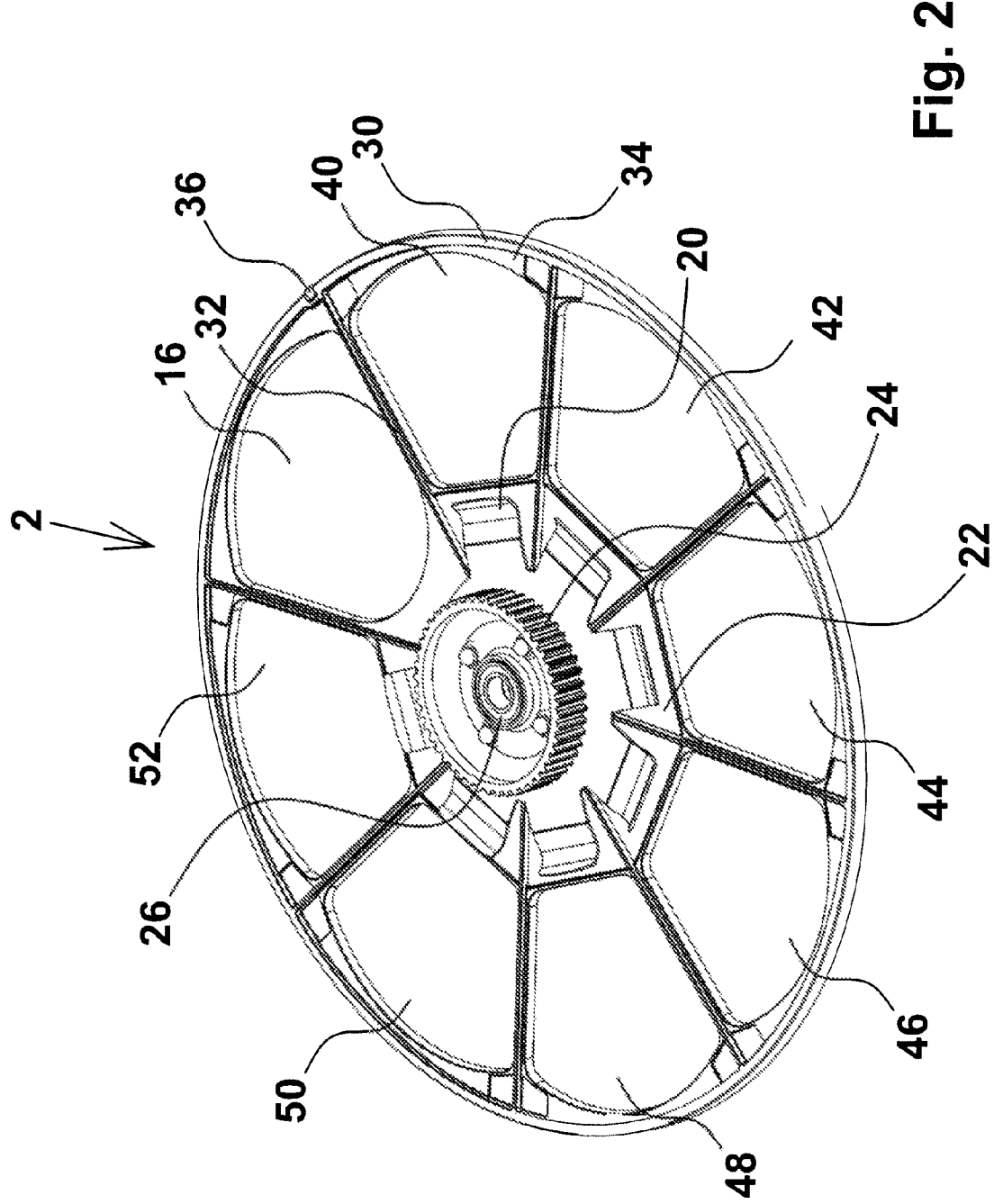
FIG. 2 shows the same color wheel where the color filters are removed.

FIG. 2 shows the same color wheel 2 but in a situation where all color filters are removed. An opening 16 is shown, which is the same opening as shown in FIG. 1, which allows the free passage of light during operation. The radial protruding spring 20 is placed over the protecting plate 22. The tooth ring is indicated as well as the bearing 26 is indicated. The color wheel 2 comprises an axial outer protrusion 30 surrounding the outer edge of the color filters. Furthermore, radial protrusions 32 are indicated placed between the color filters. The color wheel 2 also comprises support areas 34 for support of the color filters. In the circular protrusion 30, a recess 36 is formed, which is used for indicating the position of color wheel 2 when it is in operation. The color wheel 2 shown in FIG. 2 has no color filters in place; therefore, there are openings 40-52 through the color wheel. By these openings 40-52, seven positions are free for color filters and one opening 16 is free.

Figure 3:
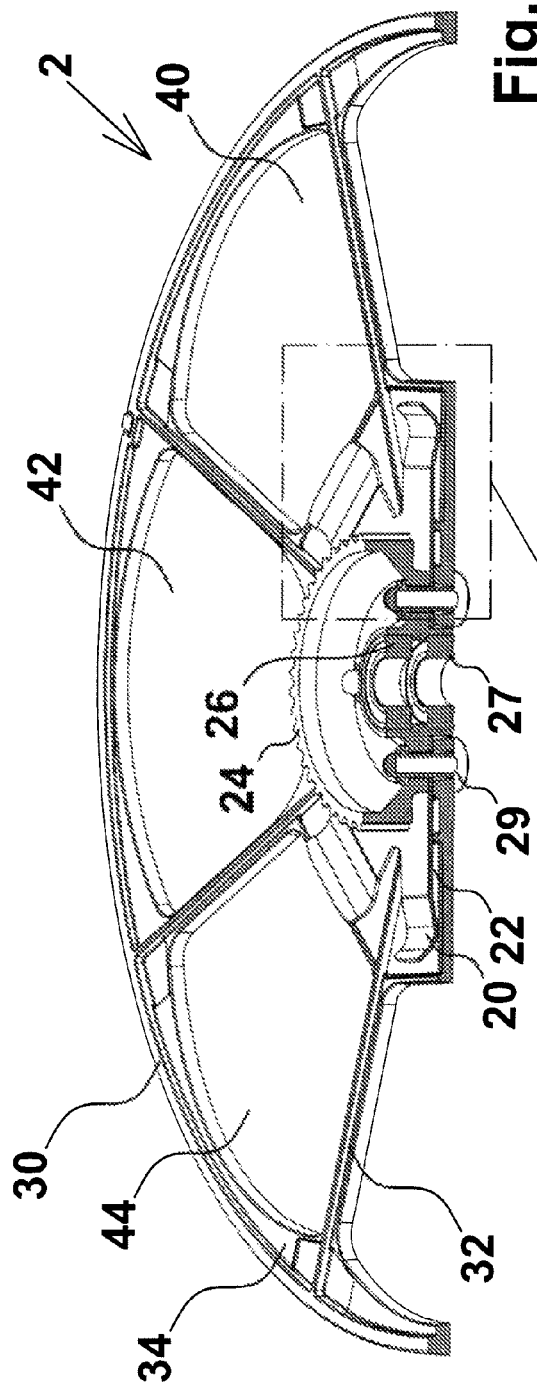
FIG. 3 shows a sectional view of a color wheel.

FIG. 3 shows a sectional view of a color wheel 2 where FIG. 3 shows a cut through the radial protruding spring 20 and the support plate 22 placed there below. Further, the tooth ring 24 and bearings 26, 27 are indicated. Screws 29, which are interconnecting the tooth ring 24 and the radial protruding spring 20, are also indicated with the color wheel. Furthermore, the axial protrusion 30 and the radial protrusion 32 are indicated. Also, the support area 34 is indicated, as are the openings 40, 42 and 44 are shown.

Figure 4:
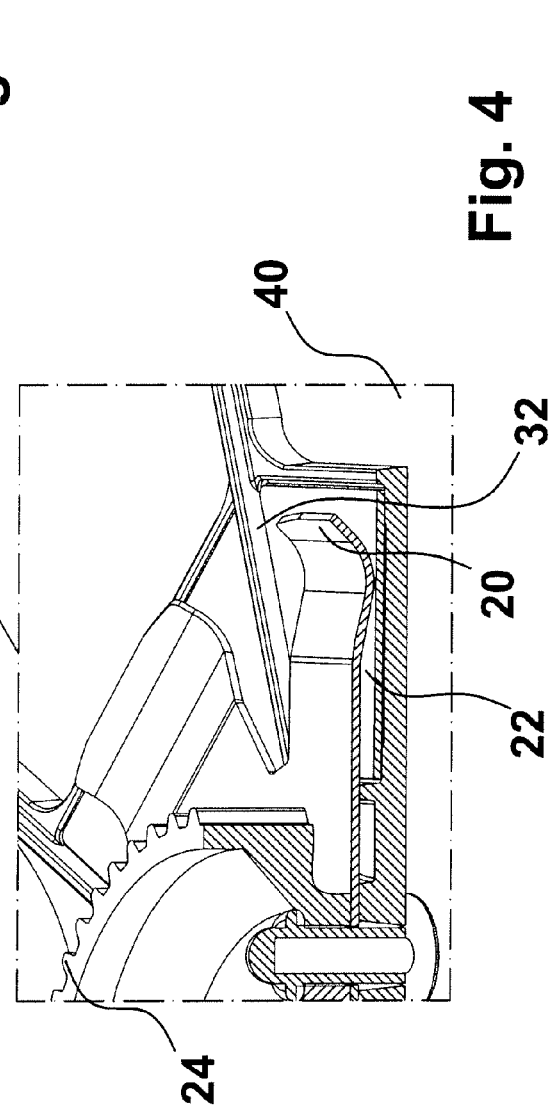
FIG. 4 shows an enlarged sectional view of a color wheel.

FIG. 4 shows an enlarged sectional view of a color wheel according to this invention. The protruding spring 20 is indicated in the front as well as the protecting plate 22 placed there below. Furthermore, the tooth ring 24 is shown on FIG. 4. The radial protrusion 32 and the opening 40 are indicated.

A color wheel as described in the FIGS. 1-4 can be formed of different materials by pressure molding or by machining and many different materials can be used. Because of the high temperature that occurs when using the color filters, heat resistant materials are most effective for a color wheel. Metal or metal alloys are the best materiel for the color wheel when high temperature performance is necessary. In order to reduce the total weight of a light fixture, which has to be placed over a stage, light material is preferred. Therefore, one possible material for this color wheel will be magnesium. If magnesium is used, then there are a number of magnesium alloys, which can be used. Especially, if magnesium or magnesium alloys are used, it is necessary to have the protection plate 22 placed where the edge of the color filter is touching the surface. A direct contact between magnesium and the edge of a color filter might damage the color wheel. Therefore, a plate of a harder material such as stainless steel is preferred.

What is claimed is:

1. A light fixture, comprising:
   at least one light source for generating a beam of light,
   at least one color wheel, which color wheel comprises a plurality of color filters mounted on the periphery of the color wheel, which color filters are positioned mostly contiguous to each other, the color wheel being rotatable to place a respective one of the color filters in position to intercept the light beam,
   wherein the color filters are replaceably fixed to the color wheel by a central protruding spring, which central protruding spring comprises a number of radial protruding tongues for fixation of the color filters,
   wherein the color wheel further comprises a number of radial protrusions formed between the color filters and a circular outer protrusion outward of the color filters,
   wherein the radial protrusions and outer protrusion form an open framework within which each of the color filters is held over a respective opening of the framework by a respective one of the tongues of the central protruding spring.

2. A light fixture according to claim 1, wherein the color wheel further comprises a protection material placed below the color filters and below the radial protruding tongues.

3. A light fixture according to claim 2, wherein the color wheel is formed of a molded component onto which the radial protruding tongues and the protection material are fixed.

4. A light fixture according to claim 3, wherein the color wheel is primarily formed of a material comprising magnesium.

5. A light fixture according to claim 4, wherein the color wheel is held in place on an axel by magnetic attraction.

* * * * *